United States Patent [19]

Katz, deceased

[11] Patent Number: 4,788,449
[45] Date of Patent: Nov. 29, 1988

[54] REDUNDANT POWER DISTRIBUTION

[75] Inventor: Jonathon H. Katz, deceased, late of Brookline, Mass., by Yetta E. Katz, heir

[73] Assignee: The Foxboro Company, Foxboro, Mass.

[21] Appl. No.: 42,137

[22] Filed: Apr. 24, 1987

[51] Int. Cl.⁴ .............................................. H02J 3/32
[52] U.S. Cl. ........................................ 307/43; 307/64; 307/66; 307/38; 136/244; 323/906
[58] Field of Search ...................... 307/64, 66, 84, 85, 307/86, 87, 43, 46, 48, 44, 47, 49, 50, 51, 52, 53, 54, 55, 56, 57, 58, 59, 60, 61, 62, 63, 24, 26, 27, 28, 34, 35, 36, 37, 38, 39, 40, 41, 42, 19; 340/310 R, 310 A, 310 CP; 320/7, 16, 15; 323/906; 136/244, 252, 245; 429/9, 99, 149, 152, 154, 156, 158, 160, 161

[56] References Cited

U.S. PATENT DOCUMENTS

| | | | |
|---|---|---|---|
| 3,474,256 | 10/1969 | Begent | 307/64 X |
| 3,956,638 | 5/1976 | Ahrens et al. | 307/48 |
| 4,171,491 | 10/1979 | Theyse | 322/4 X |
| 4,175,249 | 11/1979 | Gruber | 323/271 |
| 4,513,167 | 4/1985 | Brandstetter | 323/906 X |
| 4,528,458 | 7/1985 | Nelson et al. | 307/66 X |
| 4,539,487 | 9/1985 | Ishii | 307/64 X |
| 4,651,080 | 3/1987 | Wallace | 323/906 X |
| 4,659,942 | 4/1987 | Volp | 307/19 |

Primary Examiner—William M. Shoop, Jr.
Assistant Examiner—Paul Ip
Attorney, Agent, or Firm—Terrence Martin

[57] ABSTRACT

A fault-tolerant power distribution architecture is described in which electrical power-consuming modules are connected in rows via individual busses in a first set of busses connected to individual power supplies in a first set of power supplies, and are also connected in columns via successive busses in successive sets of busses connected to power supplies in successive sets of power supplies such that each module receives power from a unique combination of a first bus and a first power supply and a successive bus and successive power supply.

16 Claims, 3 Drawing Sheets

REDUNDANT POWER DISTRIBUTION

TECHNICAL FIELD

This invention relates to the art of redundantly providing power to electronic modules in a process control system wherein the power is derived from one or more current mains, via a plurality of power distribution sources in a fault-tolerant scheme.

BACKGROUND ART

Direct current converters or DC power supplies are conventionally powered from one or two sources, usually either regular mains or factory power. In a single-source system, of course, each module powered by the power supply receives power from a single source. The powered modules are simply connected in parallel via a single power bus system. In a conventional "fail-safe" or double-source system, each of the powered modules is connected in parallel along a first bus to a first source and also along a redundant second bus to a second source; each module receives power from either of the two sources. This technique provides protection in the case of a single supply failure (or supply source failure when the supplies are fed power from separate sources) and in the case of any individual module presenting an open circuit to the supply bus. These are the more common failure mechanisms; the prior art methods usually work well as simple redundant supply techniques.

However, when a module fails such that a short circuit is presented to the bus or when a bus or power supply fails such that the short circuit is presented to all modules along the bus, the reliability of the redundant supplies fails and continued supply of power to the modules is lost. Failure of both the first and second busses supplying a given set of modules results in failure of all the modules in that set. The present invention is directed to solving these problems.

The availability of power to operate the equipment in a process control system, like many other systems, is dependent on the availability of power. Availability is a function of reliability and mean-time-to-repair. Often, when a module or power supply fails it is difficult to repair/replace it without turning off power to the entire system or at least disconnecting a group of modules. It is preferable to restore the power supply with minimal loss of power to the system or subsystem. This is called 'hot' repair or replacement, and is facilitated by the present invention. 'Hot' repair was difficult or impossible to safely achieve with many prior art redundant power supply techniques. The present invention facilitates rapid repair by enabling replacement of failed modules or power supply units without disrupting the entire system or subsystem in which the power failure occured.

Prior art redundant mains (also called 'factory') power frequently consisted of merely switching between two sources of AC power. This method may involve a 'dropout' of AC power, which if of sufficiently long duration is harmful to solid-state systems and causes loss of memory in power-dependent memory devices. An embodiment of the present invention extends the redundant technique to a supply architecture in which line voltage dropout is minimized or eliminated, and in combination with the power distribution technique disclosed provides fault tolerance which provides both fully redundant power and power distribution using the same set of modules required for non-redundant power.

DISCLOSURE OF THE INVENTION

In the present invention, the powered modules are electrically arranged such as may be visualized most easily by a rectangular array of union and intersect points, or a matrix of rows and columns such that each row represents a group of modules receiving power from a first bus, and each column represents a group of modules receiving power from a second bus. All row power busses comprise the first set of busses and all column power busses comprise the second or successive set of busses. Each bus is connected to a separate power supply. Each module in the entire collection of modules receives power in a fault tolerant manner from an exclusive combination of two different power supplies including a first bus and a successive bus. No two modules are dependent on power from the same combination of power supplies. Failure of any two separate supplies can only result in loss of power to a single module. This fault-tolerant technique prevents a short circuit in any individual module from interrupting power to other modules, and is accomplished without necessitating additional power supplies or converters. Extra redundancy is provided by supplying the 'row' power supplies with power from a first main source and the 'column' power supplies from a second main source.

Each module may optionally include power conversion when required, and may be supplied with either AC or DC source power. That is, either or both AC and DC power may be supplied to the power supplies or to the power-consuming modules. A failure of either the AC or DC sources does not result in failure of the power-consuming module due to power loss. This permits maximum voltage and current flexibility in a system of multiple modules and/or subsystems including multiple modules.

It is not intended that the scope of the present invention be limited to a rectangular matrix connection scheme, but rather includes configurations of power distribution wherein multiple power supplies provide power to a plurality of powered modules wherein each powered module receives power from a unique combination of two power supplies.

It is therefore an objective of the present invention to provide improved redundance in multiple sources of power to a plurality of circuit modules. Another object is to provide fault-tolerant supply of power to a plurality of circuit modules.

An advantage of the present invention is that short-circuits in individual modules, busses, or supplies does not cause loss of power to the remaining modules. Another advantage is that 'hot' replacement or repair of defective power supplies is facilitated.

BRIEF DESCRIPTION OF THE DRAWING FIGURES

Numerous features of the invention disclosed herein will be apparent upon examination of the drawing figures forming a part hereof. In all views, like reference characters indicate corresponding parts:

DESCRIPTION OF THE PREFERRED EMBODIMENTS

The invention will be described in simple form, omitting such extra circuit elements as are ordinarily used for transient protection, overload protection, load switching, and electromagnetic interference, in order to improve understanding of the invention. While such circuit improvements are not described, their omission is not intended to exclude systems incorporating these improvements from the scope of the claims.

Figure 1:
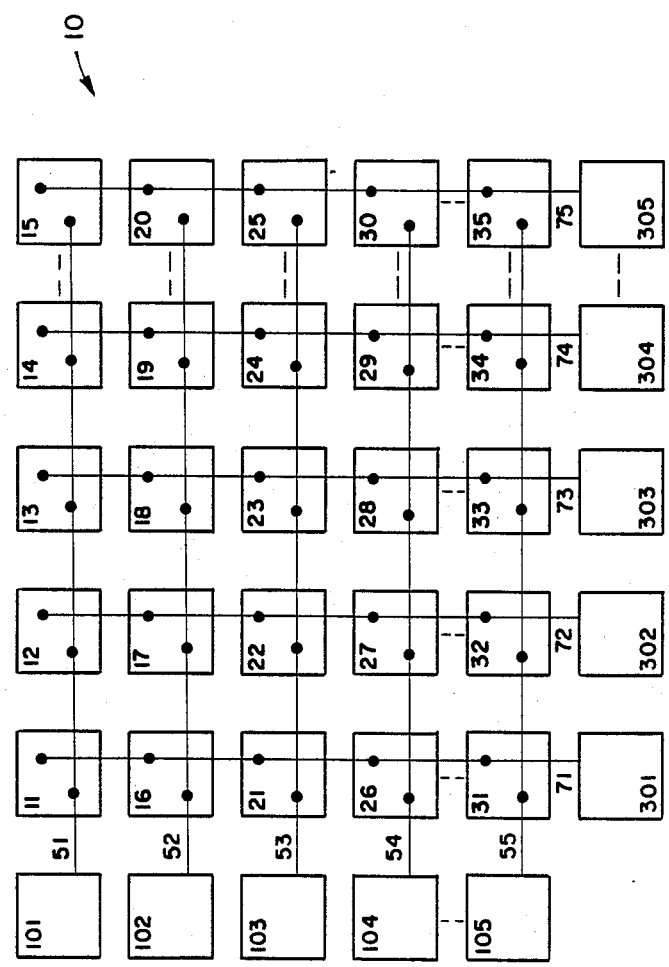
FIG. 1 is a simplified block diagram illustrating the present invention in simple form as a matrix.
Figure 3:
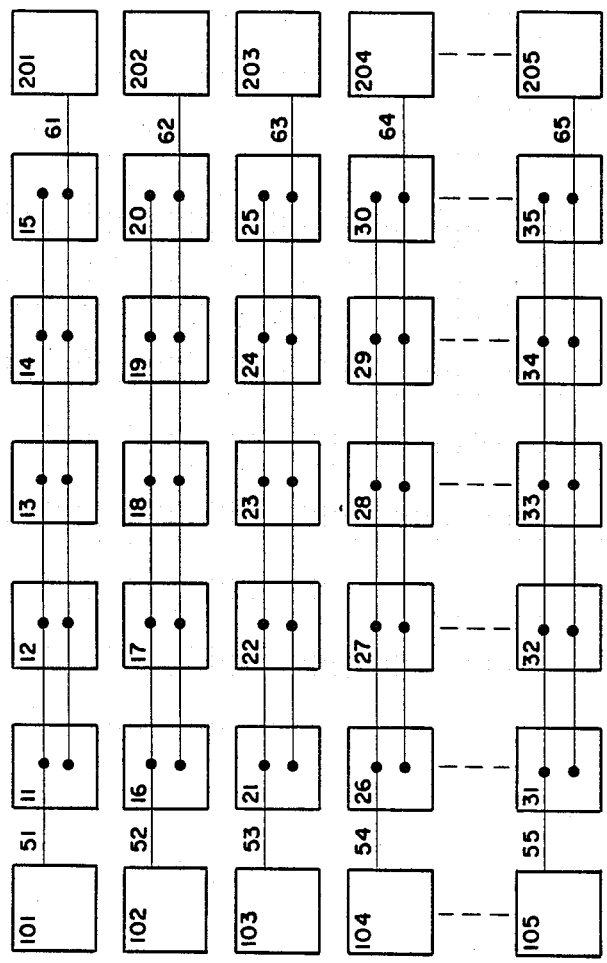
FIG. 3 is a simplified block diagram of the technique common in the prior art.

The advantages of the present invention 10 shown in FIG. 1 are best seen in comparison with the prior art. Turning first to the prior art, FIG. 3 shows a technique common in the system power supply art for redundant supply of power to multiple modules 11-35. In this architecture, each module is a row group (e.g. 11-15, 16-20, etc.) receives power from a first power supply in a set of first supplies 101 through 105 along a first bus in a set of first busses 51-55 and also from a second supply in a second set of supples 201 through 205 along a second bus in a set of second busses 61-65. An open circuit failure in a module 11-35 won't result in a failure in another module 11-35. A short circuit in an individual module 11-35 may result in a short circuit along an entire bus. For example a short circuit in module 13 can result in loss of power to all modules in the group of modules 11 through 15 by shorting both busses 51 and 61. Such short circuits may be caused by component failure, failure of protective measures, physical or environmental damage, or catastrophic events. The failure of a power supply through an output short circuit can short circuit the power inputs to all of the modules to which it supplies power. A short circuit along a bus or in a power supply can result in a loss of power to all modules powered by a given bus or power supply, including loss of power from the redundant bus. Again, for example, if power supply 201 or bus 61 is short-circuited, modules 11 through 15 all lose power. If there is a loss of power failure on both bus 53 and on bus 63, all modules in the group of modules 21-25 lose power. Troubleshooting may be impaired or delayed because the failure location may not be apparent and may be difficult to trace under power-on conditions.

In the technique of the present invention 10, FIG. 1, a similar group of modules 11-35 receives power from a first power supply 101 in a first set of power supplies 101-105 along a first bus 51 in a set of first busses 51-55. Module 11 also receives power from another power supply 301 in a set of second power supplies 301-305 along another bus 71 which is a bus element of a second set of busses 71-75. The dotted lines, as between modules 14 and 15 and between power sources 104 and 105, indicate that the architecture may be expanded to include any appropriate additional rows and columns. Note that it is not essential for the modules to be connected to orderly arrangements of row and column busses, as the modules may be connected to the busses in random order. Each of the modules 11-35 receives its power from either or both of a unique set of two power sources. For the orderly matrix example illustrated, module 13 receives power from either or both power sources 101 and 303.

Troubleshooting is facilitated in that any loss of power along a single row or column bus does not interrupt power to any given module. Thus, power supplies may be exchanged without loss of power to any module when a single bus/power supply failure occurs. 'Hot' exchange enables rapid troubleshooting and repair. Similarly, with loss of power along any two bus/powers supply paths results in loss of power to a single module only. 'Hot' replacement of power supplies is still available, and troubleshooting along a bus is made possible because all modules along any row or column continue to receive power from two sources except the affected row or column. Identification of the module sustaining the double-fault power loss, normally a traceable alarm function, gives immediate recognition of the failed bus/power row and column combination. Replacement or repair of either failed power supply or bus restores power immediately, and replacement or repair of the other failed power supply or bus restores redundant, fault-tolerant power.

Figure 2:
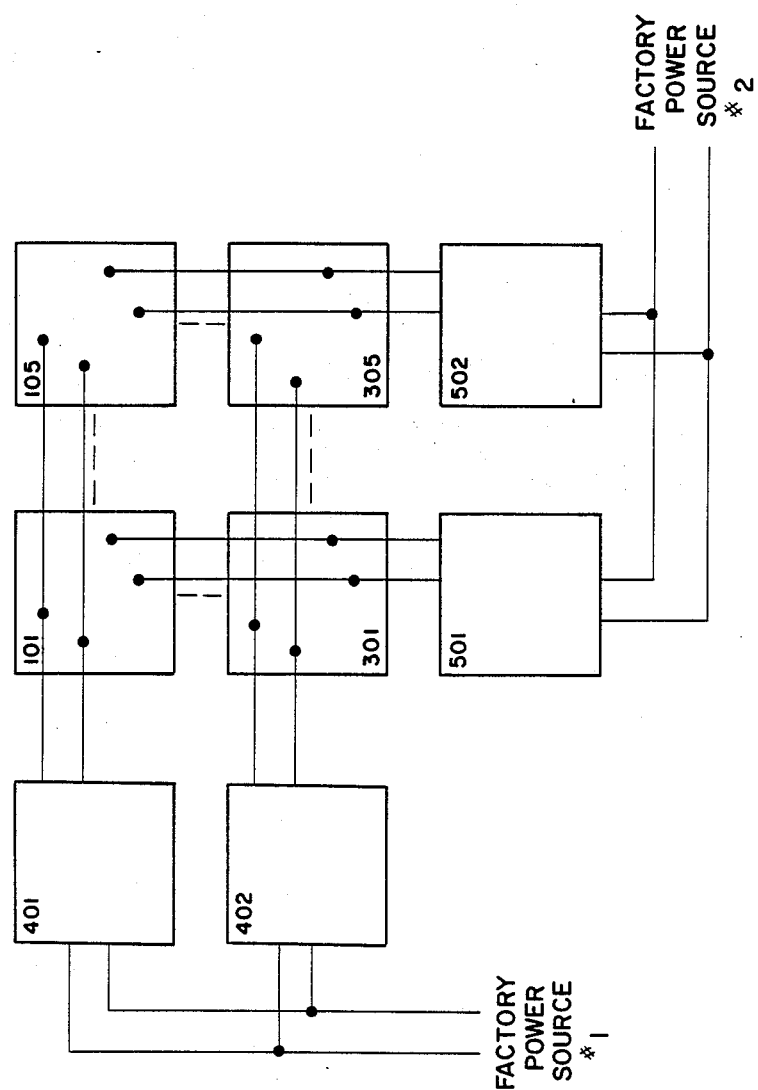
FIG. 2 is a simplified block diagram illustrating the invention in an alternate embodiment.

An extension of this power source technique is shown in FIG. 2, where each of a plurality of power sources 101-105 and 301-305 are shown for illustrative purposes. Each of the power supplies receives its power from a unique combination of major power such as two separate sources of mains or factory power. The power sources may be either AC or DC, including both mains and factory power. This means that sources of power to the power supplies (or to the power-consuming modules) may be OR'ed for redundancy. For example, power supply 101 receives its power from either or both power sources 401 and 501. Since each set of power sources receives its power from a separate factory power source or mains, loss of factory power from either mains will not result in power failure to a single power source 101. Referring again to FIG. 1, each module 11-35 is supplied by a unique combination of power supplies 101-105, 301-305, and with each power supply provided with a separate power source 401, 402; 501, 502 (FIG. 2) multiply redundant and fault-tolerant power is always available to each module 11-35 except for massive, multiple source failures or interruptions.

The foregoing examples are provided for illustrative purposes only and are not intended to limit the following appended claims solely to the specific examples given.

It is claimed:

1. Redundant power distribution apparatus for use in an organization of electrical power consuming modules, comprising:
    (a) at least one power bus in a set of power busses;
    (b) at least one power supply in a set of power supplies, each of which power supplies is connected to a respective power bus from the set of power busses;
    (c) a plurality of power consuming modules forming a group of modules, each being connected in turn to a power bus;
    (d) additional individual power supplies;
    (e) additional individual power busses, each of said additional power busses being connected in turn to one of said additional power supplies;

wherein each of said power consuming modules is connected to and receives power only from a unique combination of:
    a power supply in the set of power supplies and a power bus in the set of power busses, and
    one of said additional power busses which is connected to one of said additional power supplies.

2. Power distribution apparatus for use in an organization of electrical power consuming modules enabling 'hot' replacement of defective modules, comprising:

(a) at least one power bus in a first set of power busses;

(b) at least one power supply in a first set of power supplies, each of which first power supplies is connected to a related power bus from the first set of power busses;

(c) at least one power bus in a second set of power busses;

(d) at least one power supply in a second set of power supplies, each of which second power supplies is connected to a related power bus from the second set of power busses;

(e) a plurality of power consuming modules forming a group of modules, each being connected in turn to a first power bus and a second power bus;

wherein each of said power consuming modules is connected to and receives power from a only power supply in the first set of power supplies via a related power bus in the first set of power busses and a unique combination of one of said second power supplies via a related second power bus in the second set of power busses.

3. Apparatus as in claim 2 wherein said individual power consuming modules are connected in a matrix configuration to receive power only from a unique combination of a power supply in the first set of power supplies via a related power bus in the first set of power busses and a power supply in the second set of power supplies via a related power bus in the second set of power busses.

4. Apparatus as in claim 2 wherein at least one of said power supplies provides alternating current.

5. Apparatus as in claim 2 wherein at least one of said power supplies provides direct current.

6. Apparatus as in claim 4 further including power conversion means on-board within each of said modules.

7. Apparatus as in claim 6 further including power regulation means on-board within each of said power consuming modules.

8. Apparatus for providing redundant current from first and second mains power sources to a plurality of power supplies, comprising:

(a) first means for deriving power from said first current mains;

(b) successive first means for deriving power from said first current mains;

(c) second means for deriving power from said second current mains;

(d) successive second means for deriving power from said second current mains; and (e) means for connecting each of said power supplies to a unique combination of said means for deriving power from said first current mains and said means for deriving power from said second current mains.

9. Apparatus as in claim 8 wherein at least one of said power sources is a direct current source.

10. Apparatus as in claim 8 wherein at least one of said power sources is an alternating current source.

11. Apparatus as in claim 8 wherein said means for deriving power from a first current means produces alternating current and said means for deriving power from a successive current means produces alternating current.

12. Apparatus as in claim 8 wherein said means for deriving power from a first current means produces direct current and said means for deriving power from a successive current means produces direct current.

13. The method for distributing redundant power to successive levels of power sources, comprising:

(a) providing mains power derived from a first mains to a first group of power supplies;

(b) providing mains power derived from a second mains to a second group of power supplies;

(c) distributing power from said first goup of power supplies to a plurality of power consuming modules via successive first busses;

(d) distributing power from said second group of power supplies to said power consuming modules via successive second busses;

wherein individual said power consuming modules receive power only from a unique combination of a first power bus and a second power bus.

14. The method of claim 13 wherein individual power consuming modules receive power from a unique combination of a first power bus and a second power bus in a matrix arrangement.

15. The method of claim 13 wherein the mains power distributed is alternating current.

16. The method of claim 14 wherein the power distributed is alternating current.

* * * * *